United States Patent [19]

Teraoka et al.

[11] Patent Number: 4,757,727
[45] Date of Patent: Jul. 19, 1988

[54] DIFFERENTIAL DEVICE FOR A POWER TRANSMISSION APPARATUS

[75] Inventors: Masao Teraoka, Sano; Osamu Ishikawa, Tochigi, both of Japan

[73] Assignee: Tochigifujisangyo Kabushikigaisha, Tochigi, Japan

[21] Appl. No.: 832,984

[22] Filed: Feb. 25, 1986

[30] Foreign Application Priority Data

Feb. 25, 1985 [JP] Japan .................. 60-24679[U]
Feb. 26, 1985 [JP] Japan .................. 60-25411[U]
May 27, 1985 [JP] Japan .................. 60-112139

[51] Int. Cl.$^4$ .................. F16H 1/42; F16H 1/44
[52] U.S. Cl. .................. 74/711; 74/714; 192/93 A
[58] Field of Search .................. 74/711, 714; 192/58 C, 192/93 A, 83

[56] References Cited

U.S. PATENT DOCUMENTS

| | | | |
|---|---|---|---|
| 2,313,132 | 3/1943 | Elliott | 192/58 C |
| 3,055,234 | 9/1962 | O'Brien | 74/711 |
| 3,923,113 | 12/1975 | Pagdin | 74/711 X |
| 4,022,084 | 5/1977 | Pagdin et al. | 74/711 |
| 4,031,780 | 6/1977 | Dolan et al. | 74/711 |
| 4,048,872 | 9/1977 | Webb | 74/711 |
| 4,058,027 | 11/1977 | Webb | 74/711 |

FOREIGN PATENT DOCUMENTS

| | | | |
|---|---|---|---|
| 68309 | 1/1983 | European Pat. Off. | 74/711 |
| 986817 | 3/1965 | United Kingdom | 74/711 |
| 1410061 | 10/1975 | United Kingdom | 74/711 |

Primary Examiner—Leslie A. Braun
Assistant Examiner—Dwight G. Diehl
Attorney, Agent, or Firm—Samuels, Gauthier, Stevens & Kehoe

[57] ABSTRACT

A power transmission apparatus having an input shaft connected, by planetary gearing, to two coaxially arranged output shafts. The planetary gearing permits differential rotation between the output shafts. A limiting device located between the output shafts to limit the differential rotation thereof. The limiting device includes a clutch member mounted on the first output shaft and alternating first and second clutch plates. The first plates are axially movable relative to and rotatably fixed to the clutch member, and the second plates are axially movable relative to and rotatably fixed to the second output shaft. An interengaging cam mechanism is carried on the clutch member and the first output shaft, and arranged such that upon relative angular movement between the clutch member and the first output shaft, the clutch member is moved axially to frictionally engage the first and second clutch plates.

3 Claims, 10 Drawing Sheets

DIFFERENTIAL DEVICE FOR A POWER TRANSMISSION APPARATUS

BACKGROUND OF THE INVENTION (1) Field of the Invention

This invention relates to a power transmission apparatus which is utilized for example as a central differential in a four-wheel drive vehicle.

(2) Explanation of Prior Art

Differential devices which are capable of transmitting a differential rotation from an engine through a transmission to a front drive shaft and a rear drive shaft are well known. Such differential device allow a difference in rotation between the front wheels and the rear wheels at the time when the vehicle is negotiating a curve, thus enabling a smooth run.

However, with this known of differential device, when either one of the front or the rear wheels has bogged down in muddy ground, it begins to slip and to rotate a high speeds under substantially no load. Thus, the power of the engine is consumed by the high speed slip rotation of the bogged down wheel. For this reason, there is a problem in that difficulty occurs in getting the vehicle out of the muddy ground. In order to solve such a problem, in recent years, a differential device has been provided with means to limit differential. This means to limit differential, operates when the differential rotation exceeds a predetermined value, thus allowing a vehicle to get out of muddy ground by transmitting power to the wheels having firmer ground contact.

A known differential device having such means to limit differential is shown in FIG. 1. This device comprises a transmission shaft 1 which is connected to an output shaft of a transmission and which transmits engine power, and driven transmission shafts 3, 5 which are connected in a relative manner and which receive power transmission from the transmission shaft 1. A base plate 7 is fixed to the transmission shaft 1 and planetary gears 9 are provided freely rotatably on the base plate 7. A casing 11 is provided on the driven transmission shaft 3, and an internal gear 13 which meshes with the planetary gears 9 is provided circumferentially at the inside surface of the casing 11.

The driven transmission shaft 5 is hollow and fitted onto the transmission shaft 1, with a sun gear 15 which meshes with the planetary gears 9 provided at the outer periphery of the end portion thereof. The planetary gears 9, the internal gear 13 and the sun gear 15 form a differential device 17, and the rotation of the transmission shaft 1 is transmitted to the driven transmission shafts 3, 5, freely differentially. In this case, the rotation of the driven transmission shaft 3 is transmitted to a rear differential (not shown) and the rotation of the driven transmission shaft 5 is transmitted to a front differential (not shown) through a chain 16 and a drive shaft 18.

The means to limit differential which has been added to the differential device 17 comprises a plurality of flanged plates 19 projectingly provided on the driven transmission shaft 5, fin-like plates 21 fitted between the plates 19 with certain clearance therebetween, and silicone oil 23 which has been filled in a liquid-tight state inside the casing 11. Accordingly, for instance, in case there is a relative rotation between the driven transmission shafts 3, 5, namely, in case a differential rotation is caused in the planetary gear 9 due to either one of the front wheels being bogged down in muddy ground, the silicone oil between the flanged plates 19 and the fin-like plates 21 effects resistance due to its viscosity, and thus limits this differential rotation.

However, in this kind of prior art device, since the construction is such that the limitation of the differential is effected only by the shear action of the silicone oil, as shown in FIG. 3, the rising characteristic of the limitation torque caused by the shear resistance against differential speed of rotation is inferior, and also the value of the limiting torque produced is small. As a result, there was a problem that the limiting of the differnetial could not be effectively carried out. Of course, if the number of flanged plates 19 and fin-like plates 21 is increased, the limitation torque can more or less be increased. However, in such a case there are problems that the device will become bulky and the cost of the device will also become prohibitive. Further, there is a problem that, when the temperature of the viscous fluid rises by the differential rotation, the viscosity of the viscous fluid decreases, thereby adversely affecting the ability to obtain sufficient transmitted torque.

SUMMARY OF THE INVENTION

A general object of the present invention is to provide a device which solves the above described problems.

A more particular object of the present invention is to provide a compact apparatus, and at the same time, is to improve the torque characteristic of the means to limit differential which utilizes fluid, thus providing a power transmission apparatus which can quickly and assuredly limit its differential and further, which can prevent the decrease of the transmitted torque due to a decreased viscosity caused by temperature rise.

Still another object of the present invention is to provide an apparatus which will not lock up unnecessarily or excessively.

A, power transmission apparatus in accordance with the present invention includes a transmission shaft to transmit an input power, a pair of driven transmission shafts which are capable of effecting relative rotations with respect to the transmission shaft, a differential device which connects the pair of driven transmission shafts and allows a differential rotation therebetween, and differential limitation means which limits the differential rotation when the velocity of rotation of the differential rotation exceeds a predetermined value; and the differential limitation means comprises a first plurality of plates fixed on one of the driven transmission shafts, a clutch member disposed on the other of the driven transmission shafts and having a second plurality of plates which mates with the first plurality of plates through a predetermined clearance therebetween, a viscous fluid liquid-tightly filled around the first and second plurality of plates, and a cam mechanism which functions due to a viscous resistance of the viscous fluid to force the clutch member towards a direction in which the first and second plurality of plates are fastened together at the time of the relative rotation between the driven transmission shafts.

In addition, the first and second plurality of plates can be separated from and contact with each other.

DETAILED EXPLANATION OF THE EMBODIMENT

In the following, explanation will be made on a first through a sixth embodiment of the present invention in accordance with the drawings. In each embodiment, similar members are designated with same numerals and explanation for members which are same to those which have been explained in the earlier embodiments will be omitted in the explanation of the embodiments which will appear thereafter.

Figure 1:
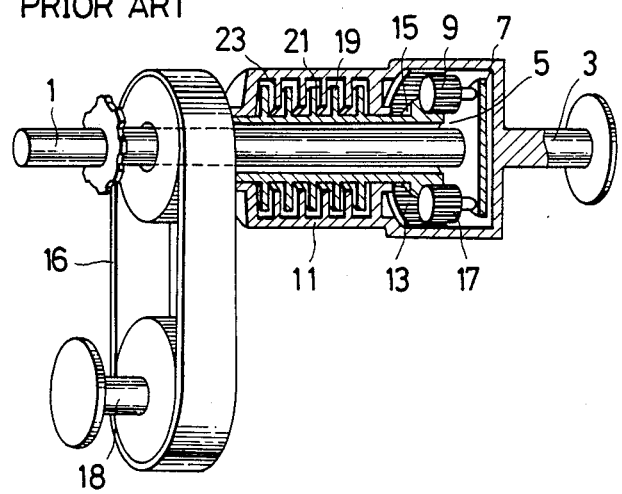
FIG. 1 is a perspective partly cross-sectional view showing a prior art differential device.
Figure 2:
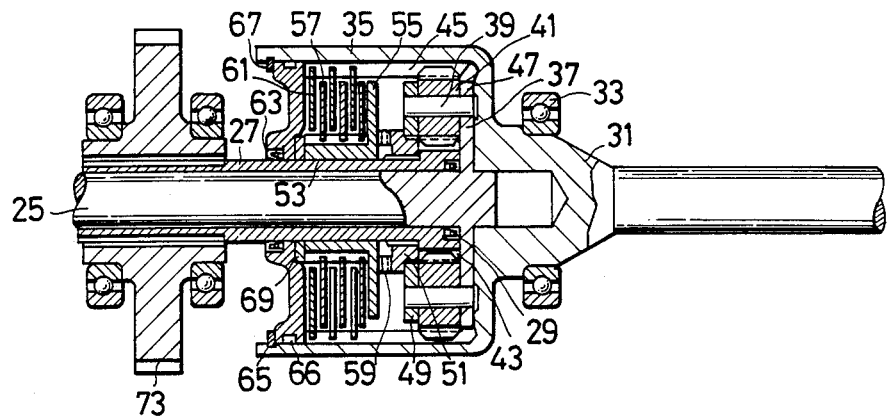
FIG. 2 is a cross-sectional view showing a first embodiment of the present invention.

In FIG. 2, there is shown in cross-section an arrangement of the first embodiment. A first driven transmission shaft 27 which is of a tubular shape is fitted freely rotatably through a seal member 29 on a transmission shaft 25 which transmits power from a transmission.

Also, a second driven transmission shaft 31 is freely rotatably supported on a bearing 33, and a casing 35 is provided at the end of this driven transmission shaft 31.

A flanged plate 37 is projectingly provided at the end portion of transmission shaft 25, and shafts 39 for rotation are fixed on a same circumference around the flanged plate. Planetary gears 41 are freely rotatably fitted on the shafts 39 for rotation. A sun gear 43 is formed on outer the peripheral surface of the end portion of the first driven transmission shaft 27, and an internal gear 45 is formed on the inside surface of the casing of the second driven transmission shaft 31. Thus, a differential device 47 is arranged with these two gears 43, 45 and the gears 41 which mesh with these two gears 43, 45.

A cam wheel 51 is fitted on the first driven transmission shaft 27 by spline. The end face of the cam wheel 51 is formed with a cam surface. This cam surface is set with a pressure angle so that groups of plates which will be described later will become locked. Further, a clutch member 53 is fitted freely, axially slidably on the first driven transmission shaft 27. This clutch member 53 consists of cylindrical member having a flange surface 55 and a group of a plurality of plates 57 which projects outwardly from the body portion of the cylindrical member. A cam following surface is formed on the flange surface 55 of the clutch member 53, and this cam following surface is made to contact the cam surface of the cam wheel 51. Thus a cam mechanism 59 is constructed with this cam surface and the cam following surface.

A plurality of plates 61 inwardly at predetermined intervals from the inside surface of the casing of the second driven transmission shaft 31 between the of plates 57 with small clearances there-between. A casing cap 65 is fitted at the end portion of the casing 35 through a seal 66 and is retained by a retaining ring 67 and also the axial portion of the casing cap 65 is freely rotatably fitted on the first driven transmission shaft 27 through a seal member 63. A base portion of a return spring 69 which is fitted on the first driven transmission shaft 27 engages the inner end face of the axial portion of the casing cap 65, and the front end portion of the return spring 69 is pressing the clutch member 53. The inside of the casing 35 which encloses these various members is filled with a viscous fluid 71 having lubricity. Each of the previously described elements, namely, cam drive gear 49, cam mechanism 59, clutch member 53, group of plates 61, elastic member 69 and viscous fluid 71 form means to limit differential which limits the differential of the differential mechanism 47 by a functional combination thereof.

Further, a power transmitting gear 73 is fixed on the first driven transmission shaft 27, and by such as a gear connection or chain connection with this power transmitting gear 73, the rotation of the first driven transmission shaft is transmitted, for instance, to a front differential (not shown). Also the second transmission shaft 31 is combined with a rear differential (not shown).

The first embodiment of this invention is constructed as described above. In the following the action thereof will be explained.

When the vehicle is following a straight path the power of the transmission shaft 25 will be transmitted to the first and second driven transmission shaft 27, 31 through the planetary gears 41. Further, in this case, since the rotational speeds of the front and rear wheels are the same, no differential action of the differential device 47 will be carried out.

When the vehicle is running on a curve, a rotational speed difference will occur between the front wheels and the rear wheels. In the case when this rotational speed difference is small, due to the spring force of the elastic member 69, differential limitation will not be carried out or will remain small.

However, in the case when either one of the front wheels or the rear wheels has bogged down in muddy ground, since the wheel which has bogged down will spin, there will occur a high speed relative rotation between the first and second driven transmission shafts 27, 31. Therefore, the planetary gears 41 which allow this high speed relative rotation will also cause a high speed differential rotation. At this time, the means to limit differential carries out the following differential limiting action. Firstly, there will occur a relative rotational difference between the group of plates 61 and the group of plates 57 due to the relative rotation of the first driven transmission shaft 27 and the second driven transmission shaft 31. By this rotational difference, both plates 57 and 61 will receive resistance from the viscous fluid 71. This resistance acts as a limiting torque to limit the differential of the planetary gears 41.

On the other hand, the differential rotation of the planetary gears is transmitted to the cam wheel 51 through the first driven transmission shaft. By the rotation of this cam wheel 51, the cam following surface of the clutch member 53 will come into contact with the cam surface of the cam wheel 51, and by the cam action thereof caused by the relative angular movement therebetween, the clutch member 53 will move towards the left in FIG. 2. As the clutch member 53 moves towards the left, the clutch member 53 will receive a spring force. This spring force acts as a reaction against the pressing force between the cam surface and the cam following surface, and limits the fastening lock between the group of plates 57 and the group of plates 61 up to a certain relative rotational difference, carrying out a differential limitation such as shown (O-A) in FIG. 3. When the cam action of the cam mechanism 59 further proceeds by the differential rotation, a locking of frictional joint between the group of plates 61 and the group of plates 57 is effected. As a result, the differential of the planetary gears 41 is stopped, and the power of the transmission shaft 25 is effectively transmitted to the wheel that has not bogged down, thus acting to free the wheel from the muddy ground.

Figure 3:
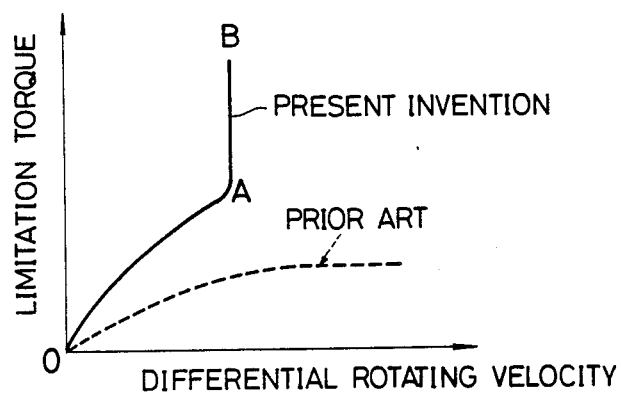
FIG. 3 is a characteristics diagram showing the relationship between differential rotation velocity and the differential limitation torque.

In this manner, according to the first embodiment, the differential limitation will, in its early stage, namely during the period of O to A in FIG. 3, be carried out with the fluid resistance while the frictional joint being limited to a certain extent by the action of the elastic member 69, and when the differential rotation becomes beyond a certain point, the groups of plates 61, 57 are locked. Therefore, it is possible to make the apparatus compact without increasing the number of plates in the groups. Accordingly, as shown in FIG. 2, the rising characteristic of the differential limiting torque is improved, and also since an abrupt increase is effected beyond a certain differential rotation, the previously mentioned differential limitation can be assuredly achieved.

Figure 4:
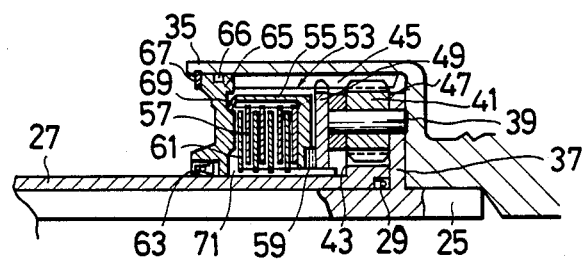
FIG. 4 is a cross-sectional view showing a second embodiment of the present embodiment.

In FIG. 4, a second embodiment of this invention is shown, the points in which the second embodiment differs from the first embodiment are that: clutch member 53 is inserted in the casing side so as to be freely, axially slidable; the group of plates 61 to be interfitted with the group of plates 57 is provided on the first driven transmission shaft 27; the cam drive plate 49 is meshed with the internal gear 45 of the casing 35; and a cam surface is formed on the end face of the cam drive plate 49 and a cam following surface is formed on the end face of the clutch member 53.

Accordingly, the second embodiment can obtain substantially the same effect as the first embodiment.

Figure 5:
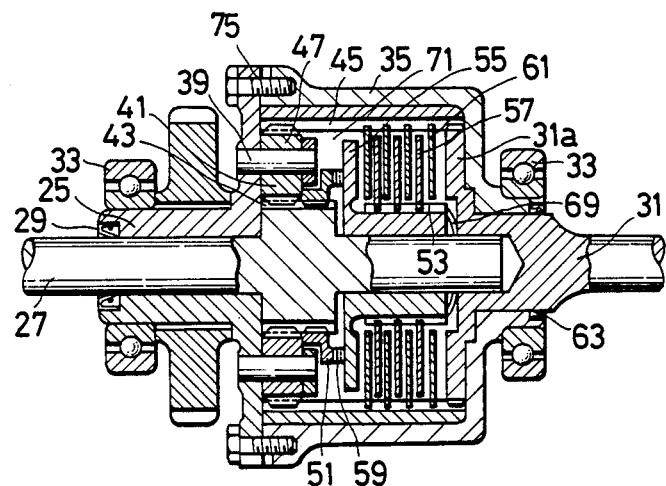
FIG. 5 is a cross-sectional view showing a third embodiment of the present invention.

In FIG. 5, the third embodiment of this invention is shown. In this third embodiment, the casing 35 is fixed to the end portion of the transmission shaft 25 by bolts 75, whereas, a flanged surface 31a is projectingly provided at the end portion of the second driven transmission shaft 31 and this flanged surface 31a is meshingly engaged with the internal gear 45 or cam jointed. The other arrangement is same to the case of the first embodiment.

Accordingly, also in the case of the third embodiment, substantially the same effect as the embodiment shown in FIG. 2 and FIG. 4 can be obtained.

Figure 6:
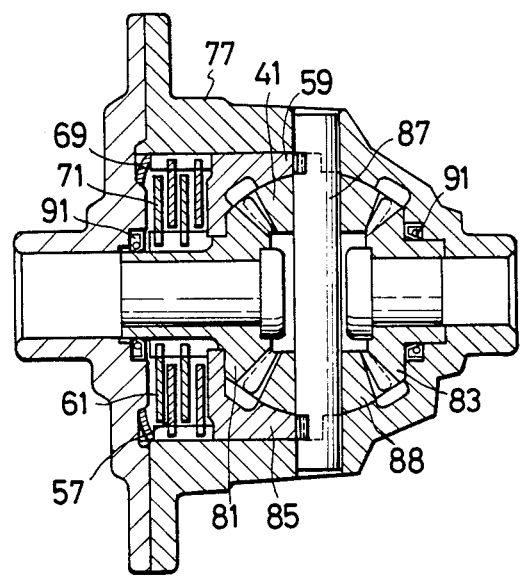
FIG. 6 is a cross-sectional view showing a fourth embodiment of the present invention.

In FIG. 6, a fourth embodiment of this invention is shown. This fourth embodiment is one in which this invention is applied to such as a rear differential of a vehicle.

In FIG. 6, a drive pinion (not shown) is provided on the transmission shaft (not shown), and this drive pinion is meshed with a ring gear (not shown) of a differential case 77. Group of plates 61 engages a side gear 81. On the other hand, the inside surface of the differential case 77 is engaged with group of plates 57 and a pressure ring 85 is freely, axially slidably fitted.

Meanwhile, a pinion shaft 87 is provided on the differential case 77 freely rotatably, and a pinion gear 88 which meshes with side gears 81, 83 is fixed on the pinion shaft 87. A cam surface is formed on the pinion shaft 87, and a cam following surface is formed on the end face of the pressure ring 85 which opposes the cam surface. The cam surface and the cam following surface form the cam mechanism 59. Further, a return spring 69 is disposed between the end face of the differential case 77 and the clutch member 53. By the spring force of the return spring, the group of plates 61, 57 receive a force in a direction which will force the groups of plates to leave away from the other. Also air-tightness is maintained by seal members 91 placed between the differential case 77 and the side gears 81, 83, and the interior of the differential case 77 is filled with a viscous fluid 71.

Since this fourth embodiment is constructed such as above, in the case where a rotational speed difference occurs beyond a predetermined value between the left and right wheels, the relative rotation between the differential case 77 and the side gear 81, namely, the relative rotation between the group of plates 61 and the group of plates 57 causes resistance of the viscous fluid 71, whereas differential rotation of the pinion gear 41, the cam action of the cam mechanism 59, the axial slide towards the left of the pressure ring 85 due to the cam action, the frictional press contact between the groups of plates 61, 57, and the self-locking by the cam mechanism are sequentially effected. Thus similarly to the cases of the other respective embodiments previously described, limitation of the differential rotation will be quickly effected.

Figure 7:
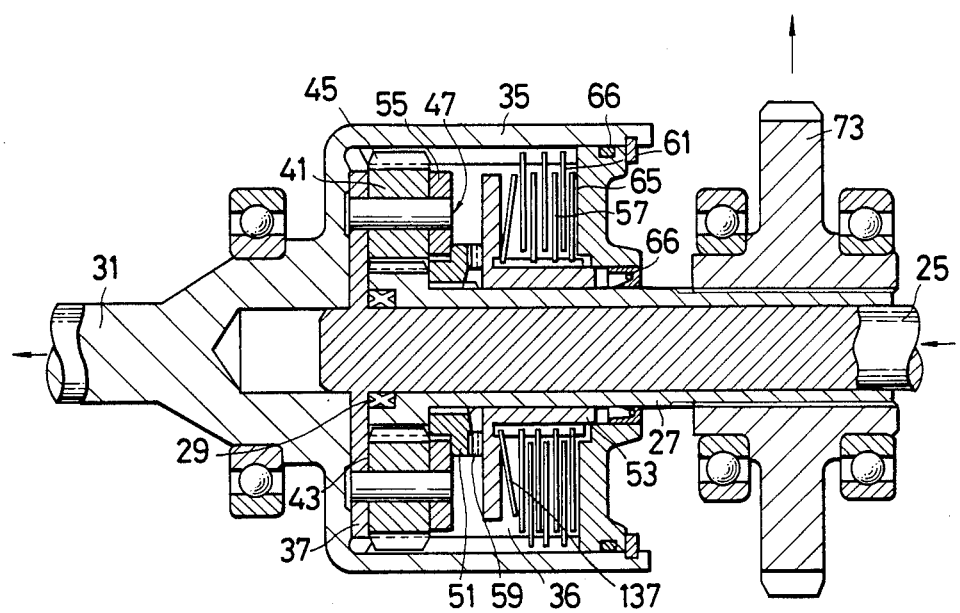
FIG. 7 is a cross-sectional view of a fifth embodiment according to the present invention.

In FIG. 7, a fifth embodiment is shown. In this embodiment, the return spring 69 of the first embodiment is replaced by a dished spring 137 as the elastic member which is interposed between first plates 61 and the flanged portion of the clutch member 53. This dished spring 137 allows the plates to be in a free state during a predetermined range of initial movement of the clutch members 53 at the time of mounting thereof.

Accordingly, when differential rotation occurs, the one of the rotational torques at that time will reach the cam mechanism 59 from the casing 35 of the driven transmission shaft 31 through the second plates 57, and the clutch members 53, and the other will reach the cam mechanism 59 from the driven shaft 27, and since there is an engagement in the direction of rotation between the both at the cam mechanism 59, there will occur an axial thrust according to the differential rotation torque due to the slope of the sloped projections on the cam mechanism 59. This thrust causes an axial movement of the clutch member 53, narrowing the space between the clutch member 53 and the case cover 65 of the casing. Thus the plates 57 and the dished spring 137 are pressed.

The first and second plates 61, 57, becomes to rotate relatively, contacting mutually under a weak pressure, and the shear resistance of the viscous fluid and the frictional resistance between the resisting plate themselves will be acted upon. By this, as shown by B-1 region of B curve in FIG. 9, until the differential speed of rotation is $B_1$, the thrust force of the cam mechanism 59 will increase according to the increase of differential speed of rotation, and thus strengthens the fastening of the first and second plates 61, 57, allowing the transmitted torque to be proportionally increased. When the differential speed of rotation is in the range of $B_1$–$B_2$ of the diagram, almost no change is made in the transmitted torque as shown by B-2 region in the diagram. This is the range in which the reaction spring force of the dished spring 137 is effective, and it is assumed that, although the differential speed of rotation changes, the fastening force of the first and second plates 61, 57, namely, the transmitted torque varies little because the reaction force of the spring is functioning as a cushion. This portion of the characteristic affords effect such as to avoid a locking state during the time when a cornering is made. When the differential speed of rotation increases and reaches beyond $B_2$ in the diagram, the transmitted torque abruptly increases as shown by B-3 region in the diagram. This shows that the thrust force of the cam means has increased beyond the reaction force of the dished spring 137 and has fastened the first and second plates 61, 57, in a locked state. This portion of the characteristic is effective to allow a quick locking in such a case when there is difficulty in getting out of a muddy ground where one of the wheels is making an idle turn.

Further, by making a selection of the functioning form of the dished spring 137, it is possible to comply with the described functioning characteristics.

Figure 9:
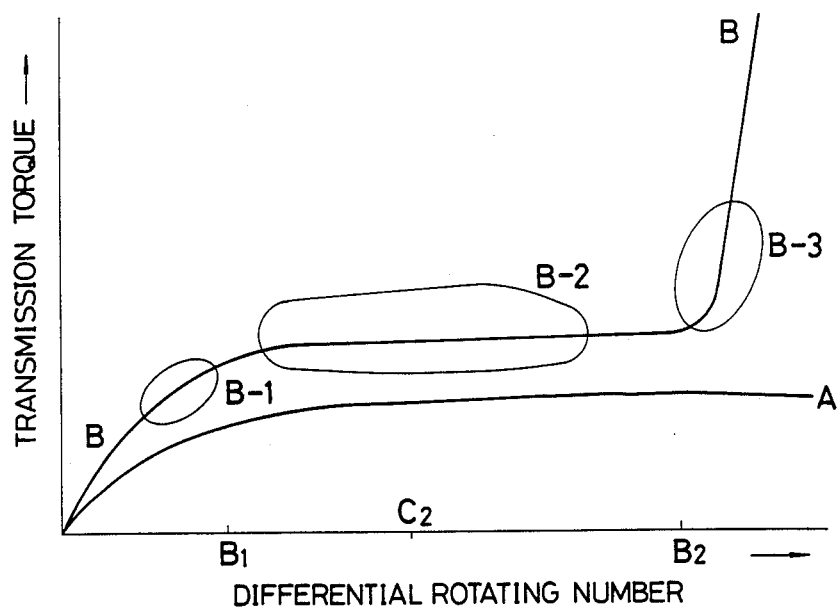
FIG. 9 is a diagram comparing the relationship between the differential rotating number and the transmission torque of the apparatus of prior art and of the apparatus of the present invention.

Further, curve A shown in FIG. 9, is the characteristics of the prior art power transmission apparatus using only the viscous resistance of the viscous fluid. As described previously, the rising characteristic is inferior, namely, it shows that the start has a gentle slope angle and that, generally, the transmitted torque level is low. And even when the differential speed of rotation increases, a locking state of the resisting plates as described previously can not be obtained by only the condition of the differential speed of rotation.

Figure 10:
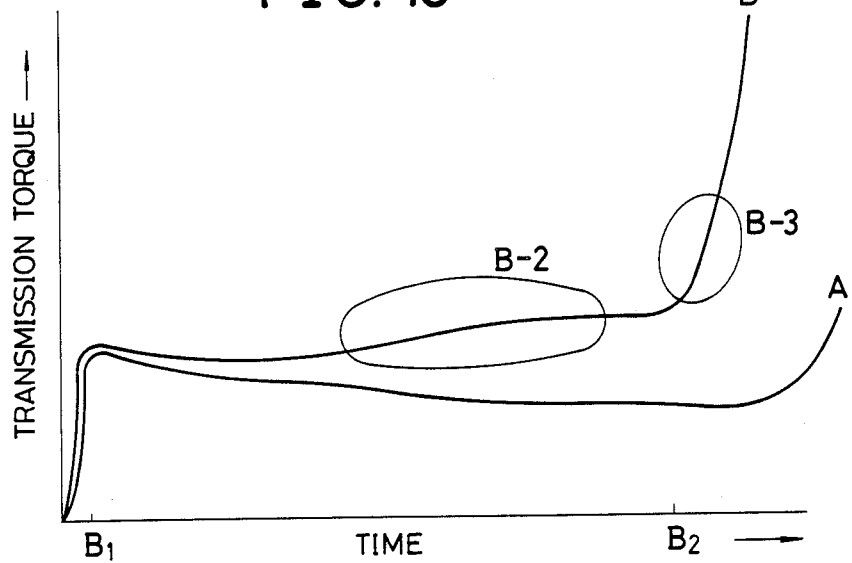
FIG. 10 is a diagram comparing the relationship between the elapsed time of differential rotation and the transmission torque of the apparatus of prior art and of the apparatus of the present invention.
Figure 11:
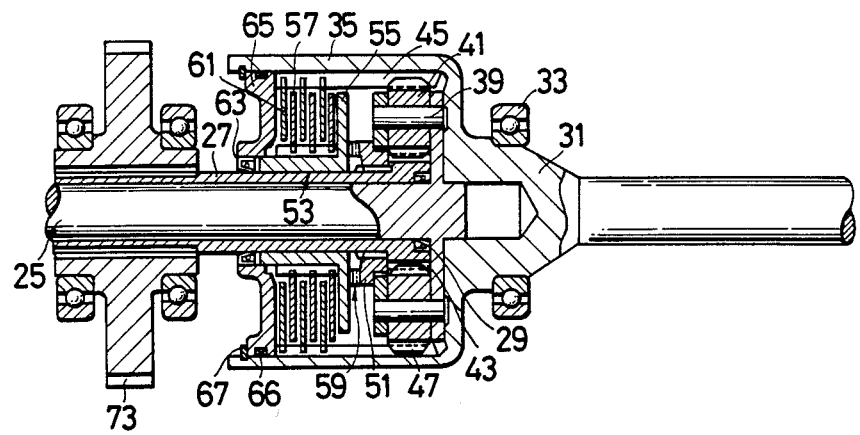
FIG. 11 is a cross-sectional view of another embodiment of the present invention.
Figure 12:
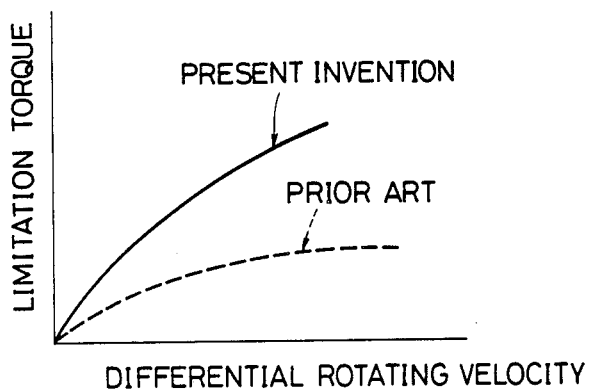
FIG. 12 is a characteristics diagram similar to FIG. 3.
Figure 13:
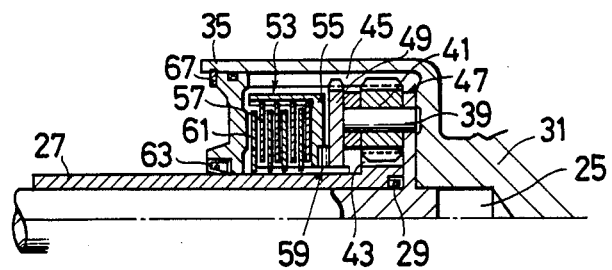
FIG. 13 is a cross-sectional view of another embodiment of the present invention.
Figure 14:
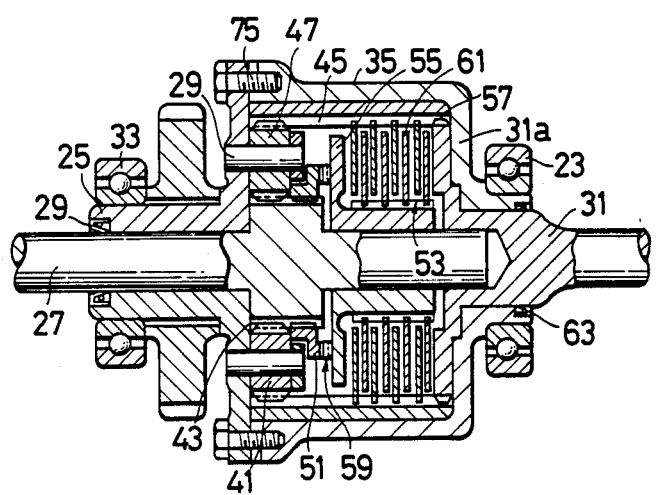
FIG. 14 is a cross-sectional view of another embodiment of the present invention.
Figure 15:
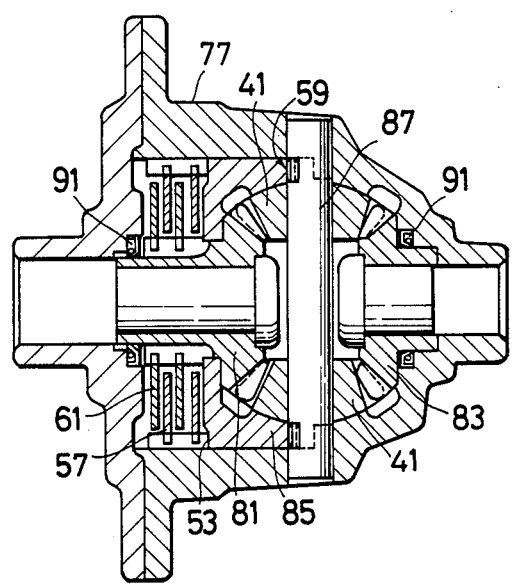
FIG. 15 is a cross-sectional view of another embodiment of the present invention.

Nextly, in FIG. 10, there is shown a relationship between the time and the transmitted torque under a certain differential rotation. In the diagram, curve B shows the characteristics under the same conditions as curve B in FIG. 9, and curve A also similarly shows the characteristics of one of prior art using only the viscous resistance of the viscous fluid. Similarly to FIG. 9, also in FIG. 10, for the prior art apparatus using only the viscous resistance, as time elapses temperature rises, and the transmitted torque decreases due to the decrease in viscosity. However, it shows that, for the apparatus of this invention, namely the one having a cam means and a dished spring, although temperature rises as time elapses, transmitted torque does not decrease, achieving generally a high level transmitted torque, and also shows that the apparatus quickly reaches the final locking state.

Figure 8:
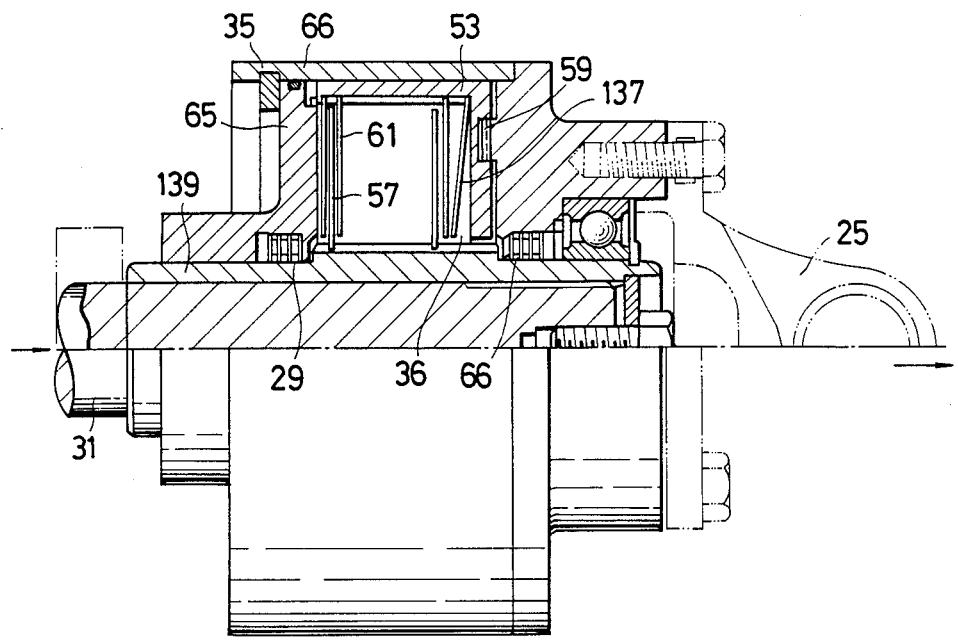
FIG. 8 is an elevational cross-sectional view of a sixth embodiment according to the present invention.

Nextly, in FIG. 8 a partially elevational and cross-sectional view of a sixth embodiment of this invention is shown. In this embodiment, the power transmitting apparatus of this invention is formed as an independent individual apparatus. In the drawing, a transmission shaft 25 extends towards the left and a first driven transmission shaft 27 extends towards the right. A casing 35 is connected to the first driven transmission shaft 27. A clutch member 53 which is a movable member is fitted inside the casing 35, freely rotatably and freely, axially slidably. Plates 57, 61, are mutually engaged between the inner periphery of the clutch member 53 and the outer periphery of a sleeve 139 which engages the outer periphery of the second driven transmission shaft 31. A cam mechanism 59 is provided between one side of the casing 35 and the flanged portion of the clutch member 53. As for the construction and function of the other portions, they are almost similar to the first embodiment, and thus the explanation is omitted.

In summary, since this invention is constructed such as described above, in spite of effecting compactness, it is possible to enhance the characteristics of the means to limit differential which uses fluid, namely it is possible to enhance the rising characteristic of the limiting torque for the differential rotation. Also, it is possible to make the limiting torque sufficiently large. Thus, in such a case when one of the wheels has bogged down in a muddy ground causing the differential speed of rotation to exceed a predetermined value, a very quick differential limitation will be effected and an assured locking will be further attained. Further, due to a resction of the elastic member, the frictional fastening force between the plates is restrained to a certain extent, therefore, it is also possible to cope smoothly with such movement as cornering.

What is claimed is:

1. In a power transmission apparatus having an input shaft means for receiving power, coaxially arranged first and second output shaft means for delivering power, and gear means for drivingly connecting said input shaft means to said first and second output shaft means and for permitting said first and second output shaft means to rotate at different speeds with respect to each other, means for limiting the speed differential between said first and second output shaft means, said means comprising:

a clutch member mounted on said first output shaft means, said clutch member being both axially movable on and rotatable with said first output shaft means;

first clutch plates axially movable on and rotationally fixed with respect to said clutch member;

second clutch plates axially movable on and rotationally fixed with respect to said second output shaft means; said first and second clutch plates being arranged in a mutually axially spaced alternating sequence within a common chamber which is formed between said first and second output shaft means and which is filled with a viscous fluid; and interengaging cam means carried on and responsive to relative angular movement above a predetermined level between said first output shaft means and said clutch member for axially urging said first and second clutch plates into frictional engagement with each other to thereby establish a friction clutch connection between said first and second output shaft means.

2. The apparatus of claim 1 further comprising means for resiliently biasing said clutch plates into said mutually axially spaced relationship.

3. In a power transmission apparatus having an input shaft means for receiving power, coaxially arranged first and second output shaft means for delivering power, and means for drivingly connecting said input shaft means to said first output shaft means, said first and second output shaft means being rotatable at different speeds with respect to each other, means for limiting the speed differential between said first and second output shaft means, said means comprising:

a clutch member mounted on said first output shaft means, said clutch member being axially movable on and rotatable with said first output shaft means;

first clutch plates axially movable on and rotationally fixed with respect to said carrier member;

second clutch plates axially movable on and rotationally fixed with respect to said second output shaft means; said first and second clutch plates being arranged in a mutually spaced alternating sequence within a common chamber which is formed between said first and second output shaft means and which is filled with a viscous fluid; and interengaging cam means carried on and responsive to relative angular movement above a predetermined level between said first output shaft means and said clutch member for axially urging said first and second clutch plates into frictional engagement with each other to thereby establish a friction clutch connection between said first and second output shaft means.

* * * * *